(12) United States Patent
Frank (10) Patent No.: US 11,599,816 B2
(45) Date of Patent: Mar. 7, 2023

(54) METHOD AND SYSTEM FOR IDENTIFYING TARGET PLATFORM

(71) Applicant: BAE Systems Information And Electronic Systems Integration Inc., Nashua, NH (US)

(72) Inventor: Ronald James Frank, San Dimas, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 515 days.

(21) Appl. No.: 16/726,532

(22) Filed: Dec. 24, 2019

(65) Prior Publication Data

US 2021/0279620 A1    Sep. 9, 2021

(51) Int. Cl.
*G06N 7/00* (2006.01)
*G06F 16/22* (2019.01)
*G06F 17/16* (2006.01)

(52) U.S. Cl.
CPC ......... *G06N 7/005* (2013.01); *G06F 16/2272* (2019.01); *G06F 17/16* (2013.01)

(58) Field of Classification Search
CPC ...... G06N 7/005; G06F 16/2272; G06F 17/16
See application file for complete search history.

(56) References Cited

U.S. PATENT DOCUMENTS

| 6,714,155 | B1* | 3/2004 | Rose | G01S 5/12 342/107 |
| 6,801,152 | B1 | 10/2004 | Rose | |
| 9,917,657 | B1 | 3/2018 | Reyes et al. | |
| 10,001,410 | B2 | 6/2018 | Baudelet | |
| 11,115,585 | B2* | 9/2021 | Kleinbeck | G01S 5/12 |
| 2004/0027257 | A1* | 2/2004 | Yannone | G01S 11/04 340/945 |
| 2004/0133380 | A1* | 7/2004 | Gounalis | G01S 7/021 702/127 |
| 2004/0207553 | A1 | 10/2004 | Rose | |
| 2005/0110661 | A1* | 5/2005 | Yannone | G01C 23/00 342/63 |
| 2008/0001064 | A1 | 1/2008 | Thomas et al. | |
| 2009/0146881 | A1* | 6/2009 | Mesecher | G01S 5/06 342/378 |
| 2015/0153225 | A1 | 6/2015 | Baudelet | |

* cited by examiner

*Primary Examiner* — Kuen S Lu
(74) *Attorney, Agent, or Firm* — Scully Scott Murphy & Presser PC; Gary McFaline (57) ABSTRACT

A method and system is disclosed for determining a probability that an encountered platform was of a specific type given that a plurality of emitters exist on the platform and each emitter has a computed probability that it is of each of a set of types. A preprocessing stage operates on a description of the environment and determines the probability of a set of events that are independent of any observation. A runtime processing stage uses the terms computed in the preprocessing stage along with data assembled from a set of observations to determine the conditional probability that a particular platform type was the type encountered.

18 Claims, 6 Drawing Sheets

Type 2 Location 2
Type 1 Location 1
34

| | 1 | 2 | 3 | 4 | Emitter Types |
|---|---|---|---|---|---|
| | 0.21 | 0.30 | 0.22 | 0.27 | Emitter Encounter 1 |
| | 0.55 | 0.15 | 0.06 | 0.24 | Emitter Encounter 2 |
| | 0.02 | 0.15 | 0.33 | 0.50 | Emitter Encounter 3 |

| C1 | C2 | C3 | C4 | C5 |
|---|---|---|---|---|
| C6 | C7 | C8 | C9 | C10 |
| C11 | C12 | C13 | C14 | C15 |
| C16 | C17 | C18 | C19 | C20 |
| C21 | C22 | C23 | C24 | C25 |

METHOD AND SYSTEM FOR IDENTIFYING TARGET PLATFORM

STATEMENT OF GOVERNMENT INTEREST

This invention was made with government support under contract #41Z2562317 awarded by U.S. Department of the Navy. The government has certain rights to this invention.

BACKGROUND

This disclosure is directed to determining the likelihood that particular type of emitting platform was detected by a receiver, and more particularly, to determining that a specific target platform type of a plurality of possible platform types was detected by a receiver on a tracking platform, the plurality of possible platform types having at least one emitter of a plurality of emitter types.

Any random event that can be observed has a set of possible outcomes. Each of the outcomes has some probability of occurring. The probability that each outcome might occur can be computed using two sources of information. The first piece is deterministic knowledge of the environment which isn't based on any unique information. This data encompasses statistics about the event itself, statistics about events which influence the event of interest, and events that can only have a single, known outcome. The second piece of information is an observation from the events surrounding the event of interest. Events whose outcome is influenced by the event of interest or influence the outcome of the event of interest are called dependent events. Knowledge of how dependent events correlate with the event of interest and observations of the outcomes of dependent events can be used as clues to help compute a more accurate estimate of the outcome of the event of interest.

If it were possible to tabulate every possible outcome of some event and somehow determine the frequency of each possible outcome using an infinite set of observations it would be possible to perfectly know the unconditional probability of each of the outcomes. Unconditional probability is the probability that an event occurs without any information about the circumstances surrounding the event. The problem with this concept is that an infinite number of observations cannot be taken before we start coding a solution to the problem. Without an infinite number of trials it is impossible to be sure that the tabulated list of outcomes is truly complete. This means that certain assumptions must be made based on a statistical certainty that the model is complete and accurate.

The observation portion of the estimation process is plagued with a similar problem. If it were possible to have a perfect understanding of the way all observable events interact with the event of interest then it would be possible to perfectly know the conditional probability of the event. This requires perfect knowledge of the unconditional probability as well. Again, it is impossible to know all the events that have some influence over the event of interest, or even exactly how a single event influences the event of interest. Assumptions must be made about which events are relevant and the accuracy of the model of the dependency of events.

BRIEF SUMMARY

In one embodiment, a computer implemented method is disclosed to determine that a specific target platform type of a plurality of possible platform types was detected by a receiver on a tracking platform, the plurality of possible platform types having at least one emitter of a plurality of emitter types. The method includes configuring a first database according to a first matrix, the first matrix comprising a respective probability for each of a plurality of possible emitter type combinations being on a single platform of the plurality of possible platform types and configuring a second database according to a second matrix, the second matrix comprising a probability that each of the plurality of possible platform types is the detected type given each of the plurality of possible combinations in the first matrix.

The method further includes receiving emitter signals from a plurality of emitters on a target platform, the emitter signals being detected by the receiver on the tracking platform in response to a tracking signal and analyzing the emitter signals to identify the number of detected emitters and the type of each detected emitter based on the first matrix. The method further includes determining the probability that a detected emitter is of a particular type for all the detected emitters and all the emitter types using information obtained from the emitter signals, determining a probability that each of the possible emitter type combinations occurred using the first matrix and the probability that a detected emitter is of a particular type, determining a probability for each of the plurality of platform types that the respective platform type was detected using the probability that each of the possible emitter type combinations occurred and the second matrix and determining the target platform type having the highest determined probability is the specific platform type detected.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment, a method and system is disclosed for determining a probability that an encountered platform was of a specific type given that a plurality of emitters exist on the platform and each emitter has a computed probability that it is of each of a set of types.

In one embodiment, the method requires a description of the occupied environment and the information gathered from observing the emitters that are present on the encountered platform. The environment description provides a tabulated set of platforms that could exist in the environment and the probability that each could be encountered when a random independent encounter occurs. For each tabulated platform there are a set of emitter configurations that could exist. The environment description provides the necessary tools to determine the possible configurations and the probability that each configuration would exist on a random, independent encounter of a platform of this type. The observation contains computed probabilities that a set of emitters were observed during an encounter. The emitters are observed and data is extracted in a separate function.

In one embodiment, to achieve a high fidelity model of unconditional probability a set of outcomes are identified that spans the complete set as completely as possible. Eventually assumptions must be made that the set is complete whether due to limited information or computational load. The events can be defined such that there are composite events that contain a large set of events and are assumed to contain the unknown events. This model attempts to achieve a set of all possible outcomes whose probabilities sum to nearly 1. The outcomes that are neglected should have negligible probability to limit their contribution to the overall error of the estimate. Likewise, the dependent observations should be as complete as possible.

In one embodiment, there are two parts of the method. The first part includes a preprocessing stage which operates on a description of the environment and determines the probability of a set of events that are independent of any observation. These calculations remain static for any set of observations and may be preprocessed. The steps of this part of the method are the following:
1. Determine all possible emitter combinations using environment description.
2. Determine the total probability that each of the emitter combinations could be encountered regardless of platform using the environment description and the combination list.
3. Determine the probability that each of the possible platform types is the type encountered given each of the possible combinations using the environment description and the outputs of the 2 previous steps.

The second part of the method uses the terms computed in the preprocessing stage along with data assembled from a set of observations to determine the conditional probability that a particular platform type was the type encountered. This is done for each of the possible platform types. The steps of this portion of the method are the following:
1. Determine the probability that a detected emitter is of a particular type for all detected emitters and all types using information gleaned from observations.
2. Determine the probability that each of the possible combinations of emitters occurred using preprocessed environmental knowledge and the observed probability.
3. Determine the probability that a particular platform was encountered using all the previously calculated data and repeat for all possible platform types.

For the purposes of this disclosure, the notation used herein is simplified for readability. Events may be defined by capital letters with subscripts. A capital letter defines some specific event. A subscript may further describe a specific type of that event. For example, $P(A_n)$ is the probability that event An occurred. This may also be used conditionally, wherein $P(A_n|B_m)$ is the probability event An occurred given Bm has occurred. In other places the probability that a random variable took on a specific value is described. For the case of a random variable, C, the probability that the random variable is equal to c would be written $P(C=c)$. This disclosure simplifies that notation to simply $P(c)$. This also can be used with conditional statements where $P(C=c|D=d)$ is written $P(c|d)$.

Preprocessing Computation

The first step of the preprocessing stage is the determination of all possible combinations of emitters that could be encountered on a single platform. This complete set spans all the possible platforms and all the configurations of emitters that could exist on each platform. A combination of items is an unordered set of items. A combination can contain any number of items and the types of items may be unique or duplicated. A combination is identical to another combination if both sets of items contain an identical number of items of each defined type. This information is computed using the environment description. This section will begin the discussion of the available data in the environment description.

The environment description is an array of matrices and a one dimensional vector. Both the array and vector are of equal length and fully describe the platform. The array of matrices describes the emitter types and the probability that each is present. The vector contains the unconditional probability that each of the corresponding platform types would be encountered during a random encounter.

Both the unconditional probability vector and the emitter type array must be of length B, where B is the total number of emitter types defined. For the purposes of this disclosure, the unconditional probability vector contains the values of $P(B=b)$ for all b where b is a member of (1, B). B is a random variable which may take on the values of 1 to B. B is the total number of platform types defined. This B length vector is indexed by b, or the platform number. The value in each element of the vector contains the unconditional probability of encountering a platform of type b when no other information is available. Since a single platform is encountered in a single encounter and the complete set of platforms is defined, the sum of the terms of this vector must equal 1.

The unconditional probability vector describes the probability that the observer might encounter a platform of each type. An encounter is defined as an event that could possibly yield some observation. An encounter has only occurred when a platform containing an observable emitter is encountered. The unconditional probability vector also describes the probability that the platform that was encountered was of a specific type given only the knowledge that an encounter occurred. It should be understood that the environment definition need not contain every type of platform that exists, but only the platforms that contain observable emitters. If no observation can be made about a platform then an encounter is impossible.

In one embodiment, the unconditional probability of an encounter may be defined using frequency. For example, for a number of encounters that might occur in an environment, what was the percentage of those events that each particular type was encountered? That frequency is the probability term when no other data is available. Extending the frequency concept further, assume that there is a constrained environment that contains a known number of each of the defined platform types and they are randomly scattered around the environment. Each of the platforms are equally likely to be encountered so the frequency of encountering a platform of a particular type is simply the ratio of the number of platforms of that type divided by the total number of platforms.

There may be times where the unconstrained probability of platform types is not available. The method described herein is enhanced by this probability term but it is no less useful when that term is not available. It is important that the requirements of the vector are maintained mathematically, but nominal values may be used in place of the known probabilities. When the probability, quantity, or frequency of platforms is unknown this lack of knowledge is expressed by equal probabilities for all platforms. This is accomplished by setting each element of this vector to 1/B.

For the purposes of this disclosure, the environment description contains an array called W. Each element of W describes a platform type. W is indexed with the format W{b}, where b is the index describing which of the B platforms are described in the element. Each element of W is a 2×Qb matrix. Qb is a unique value for each index, b, that tells the number of locations on the platform that may contain an active emitter. For the remainder of this disclosure, B is the total number of platform types that exist within the defined environment and b is the unique numerical name for each of the types. Qb is the number of emitter locations on platform b that may or may not be active and qb is the numerical index describing a unique emitter location on platform b.

Each element of the array, W, contains a description of the emitter types that may exist on a platform and the probability that they are present, active, and detected by the receiver. The array element is a 2×Qbmatrix. The first row of the matrix contains a list of emitter types. There are N emitter types in the environment. Each emitter type is assigned a unique index, n, to differentiate it from other emitter types. The emitter index, n, defines the type of emitter that may exist on any platform at any location. The column of the matrix describes a specific possible emitter location on the platform being described. The second row contains the probability that an emitter is present at the specific emitter location, is transmitting, and is detected by the receiver for an encounter with this platform type. The concept of an "emitter location" is an important one. Also, the probability described in the second row has some details that require further explanation.

Figure 1:
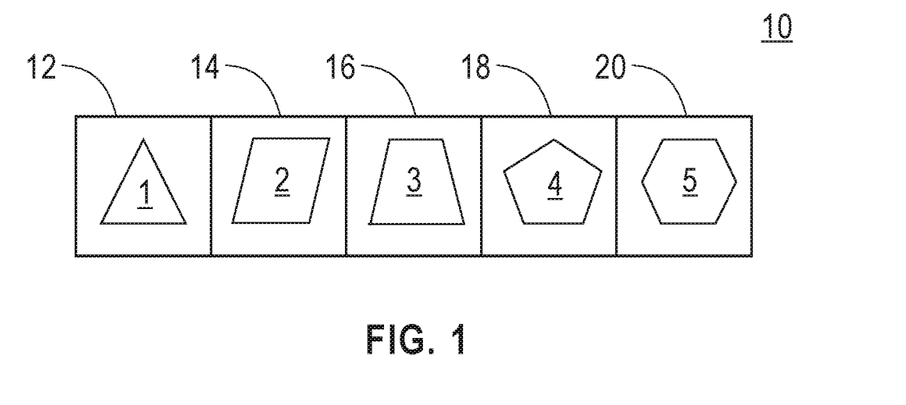
FIG. 1 is a representation of a specific platform that has five unique emitter types.

An emitter location is a location on the platform that may contain an emitter of a specific type. This emitter may be present or not, but it may not be replaced by another type of emitter. The concept of an emitter location is not necessarily tied to a geometric or geographic location, but rather a concept of an available emitter space. FIG. 1 is a one example of a representation of a specific platform 10 that has five unique emitter types, 1, 2, 3, 4, 5, with no possibility of multiple emitters of the same type. Each of these emitters 1-5 may be present or not with some probability. The presence of an emitter does not influence the probability that another emitter may be present. There are five locations 12, 14, 16, 18, 20, one for each emitter type. Each location 12-20 will have its own column in a matrix. The shape of the emitters 1-5 represents the emitter type and each is assigned a unique index. The emitter type index is universal across all platforms and must be consistent. Each column of the matrix contains a location but the actual column index has no meaning. The columns of the matrix may be permuted to any random order without changing the meaning. Equation 1 shows the format of the matrix associated with example one. For this example the emitter at each location is equally likely to be present as absent.

$$\begin{bmatrix} 1 & 2 & 3 & 4 & 5 \\ 0.5 & 0.5 & 0.5 & 0.5 & 0.5 \end{bmatrix} \quad \text{Equation (1)}$$

Figure 2:
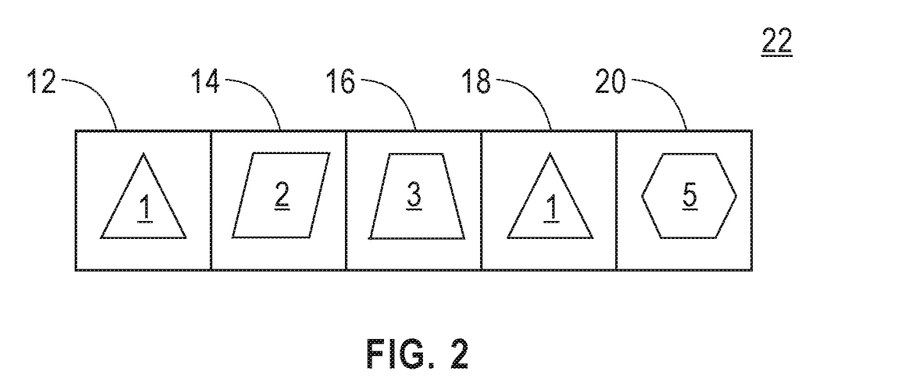
FIG. 2 is a representation of a specific platform that contains four unique emitter types.

FIG. 2 is a second example of a specific platform 22 that contains four unique emitter types 1, 2, 3, 5 at four locations but there are two locations 12 and 18 in which one of the emitter types may exist. Another way to state this could be, there are four unique emitter types on the platform 10 with a possibility that there are two of emitter type 1. The second statement does not precisely explain what the platform description matrix describes however. Explicitly, the matrix says that there are five emitter locations. To restate the previous rules, each location may or may not contain an emitter and the presence of one emitter does not influence the presence of others. Because of this, there may be an emitter present at the location described by column 1 and not at column 4, the opposite may be true, both may be present, or neither may be present. The unique emitter types are exactly as they were in example 1. Equation 2 shows the matrix representation of FIG. 2. Note that there is a repeat of emitter type 1 and also recall that the order of columns is not important.

$$\begin{bmatrix} 1 & 2 & 3 & 1 & 5 \\ 0.5 & 0.5 & 0.5 & 0.5 & 0.5 \end{bmatrix} \quad \text{Equation (2)}$$

Figure 3:
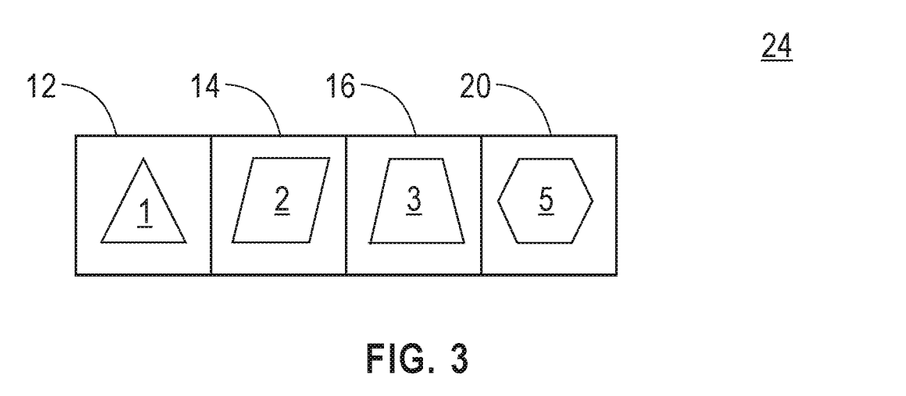
FIG. 3 is a representation of a specific platform that contains four unique emitter types.

FIG. 3 is a third example that shows how to define a platform 10 that is similar to example 2, but with emitter types 1, 2, 3, 5 at locations 12, 14, 16, 20 respectively. In this example, it is known that emitter location 12 and 18 cannot both contain emitters in any configuration. Because of this, they are defined as a single emitter location. The probability associated with this single location should be the probability that there is an emitter present in either location. Dealing with duplicate emitters on a single platform in this way is one of two ways of implying dependence between emitters. The other is by defining many platform types to describe unique configurations of what may otherwise be contained in a single platform definition. FIG. 3 and equation 3 shows the description of a platform where the fourth emitter location absorbed has been absorbed by the first. This platform type could have as many as four emitters present and as few as 0. This example has a slightly higher probability on emitter type 1 to accent this difference.

$$\begin{bmatrix} 1 & 2 & 3 & 4 \\ 0.75 & 0.5 & 0.5 & 0.5 \end{bmatrix} \quad \text{Equation (3)}$$

At this point all the data necessary to determine the complete set of emitter combinations has been identified. A combination is an unordered set of objects. In this case, the set of objects is a set of emitter types that could be encountered when encountering any of the platforms defined in the environment description array. The method to determine all the unique emitter combinations is to systematically determine all the possible combinations for each platform, concatenate them all into a single set, and remove the duplicates.

In one embodiment, the first step is identifying how to generate a list of combinations using the data from a single platform. One way is to use the first row of the description matrix and a simple binary count. Each column of this matrix will be assigned a place in an associated binary number. The order of the assignment is not important. Start by generating a count from 0 to $2^{\wedge}(Q_b)-1$. For each value of the count consider all of the 1's as "ON" and the 0's as "OFF". When a column is assigned a 1 it means that the emitter is present, otherwise the emitter is absent. After applying the binary number to determine which emitters are present for each value of the count, make a list of the emitter types that are present. Each member of the count is known as a configuration of the platform. Once the emitter type list has been identified it can be expressed in any order since this a list of combinations. A convenient way to express the combination is in ascending order of emitter type indices. Once a list of combinations has been identified and ordered, it is simple to remove the duplicate entries. Repeat this process for each platform, each time appending the complete list, and scanning the list for duplicates across the complete list.

In one embodiment, the combinations are sorted such that any time two combinations contain the same number and type of emitters, the resulting vector will be identical. This simplifies the method of removing duplicate combinations. If the lists are not sorted, it is more difficult to determine which combinations are identical.

The output of this step is an array of length C. Each element of this array is a vector containing a list of emitter types that could be encountered when a single platform is encountered.

An example is given below for an environment containing a single platform. Equation 4 shows the configuration of the single platform.

$$\begin{bmatrix} 1 & 2 & 1 \\ 0.5 & 0.5 & 0.5 \end{bmatrix} \quad \text{Equation (4)}$$

000 []
001 [1]

| 010 | [ 2 ] |
| 011 | [ 1, 2 ] |
| 100 | [~~1~~] |
| 101 | [ 1, 1 ] |
| 110 | [~~2,1~~] |
| 111 | [ 1, 1, 2] |

Note that every set will always contain the empty set, and will contain the complete set. The duplicates are shown with a strikeout. The remaining entries of the table are the complete set of combinations for a single platform.

Total Probability of Each Combination

The second step of the preprocessing stage is to determine the probability of encountering each of the unique combinations identified in the previous step. The platform description matrix, as stated, contains a row with the emitter type indices and a row containing the probability that the emitter at the location is present. Throughout this disclosure, this probability term is discussed and described using words such as encountered, observed, and present. The emitter probability row in the platform description contains the probability that an emitter is present, transmitting, and detected by the receiver in the event that a platform of this type was encountered. The column index describes an emitter location, as described earlier. The following paragraphs will discuss the concepts of presence, transmission, and detection separately and then follow with an explanation of how the three factors are used to derive the required single term.

First we will explore the concept of presence of emitters in the context of emitter locations. Consider the platform 30 in FIG. 4. This figure shows a specific boat platform with all the possible emitters present. It should be understood that the method applies to any type of platform, including all types of land, sea or air vehicles. All of these emitters may be present on an example of this platform with some probability. There exists a set of all the possible ways this platform could be configured and that set is shown in the example of Equation 4. This platform could have as few as 0 emitters present, or as many as 3. As noted above, the presence of any emitter does not give any information about the presence of any of the other emitters. The three emitter locations are shows from left to right matching the matrix in equation 4.

Figure 5:
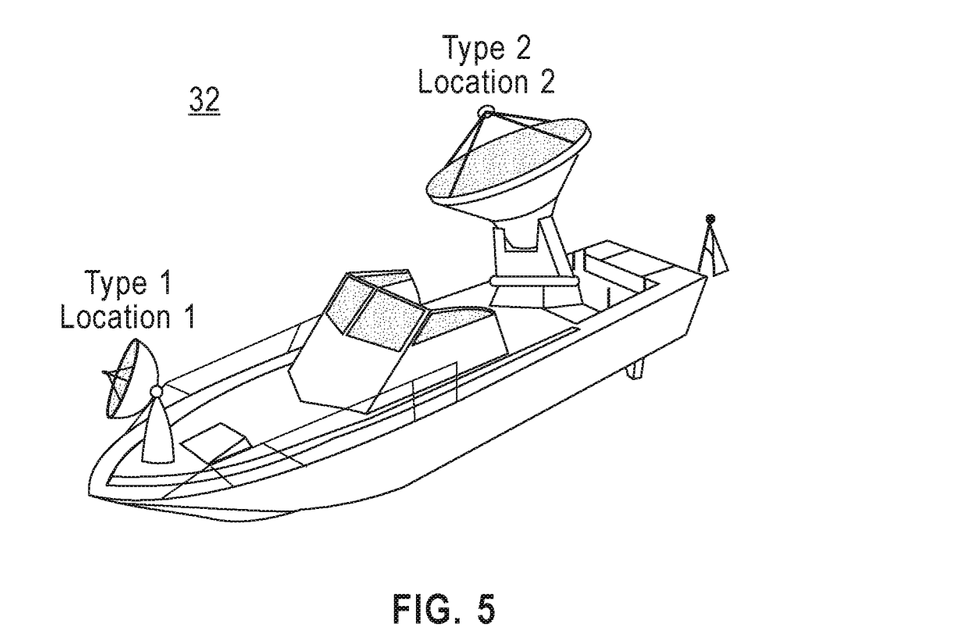
FIG. 5 shows a specific platform with possible emitters present.
Figures 6, 7:
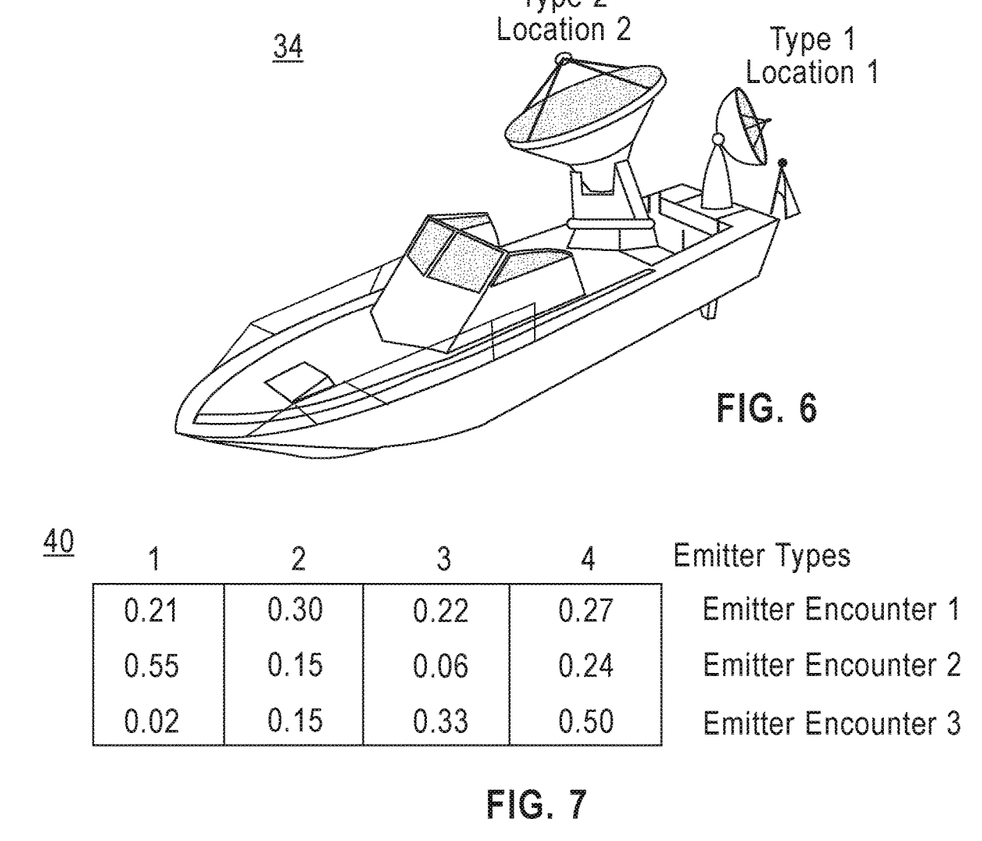
FIG. 6 shows a specific platform with possible emitters present.
FIG. 7 is an example of an observation table.

Consider this platform again with a slightly different principle regarding the rules of presence. It could be that this platform can only have 1 emitter of type 1. This platform could never be built with more than 1 of emitter type 1. Physically, the emitter could exist at the location previously described as location 1 or at location 3. But the concept of location means the opportunity to have an emitter of a particular type on a single platform. So, in the context of this method, there are only two emitter locations. There is one emitter location that may contain an emitter of type 1 and another location that may contain an emitter of type 2. Either platform 32 of FIG. 5 or platform 34 FIG. 6 may be the actual configuration of the platform, but both are completely described by the platform description given by equation 5. Note that the probabilities shown in the second row are just there to show format and don't have a meaning yet.

$$\begin{bmatrix} 1 & 2 \\ 0.5 & 0.5 \end{bmatrix} \quad \text{Equation (5)}$$

Figure 4:
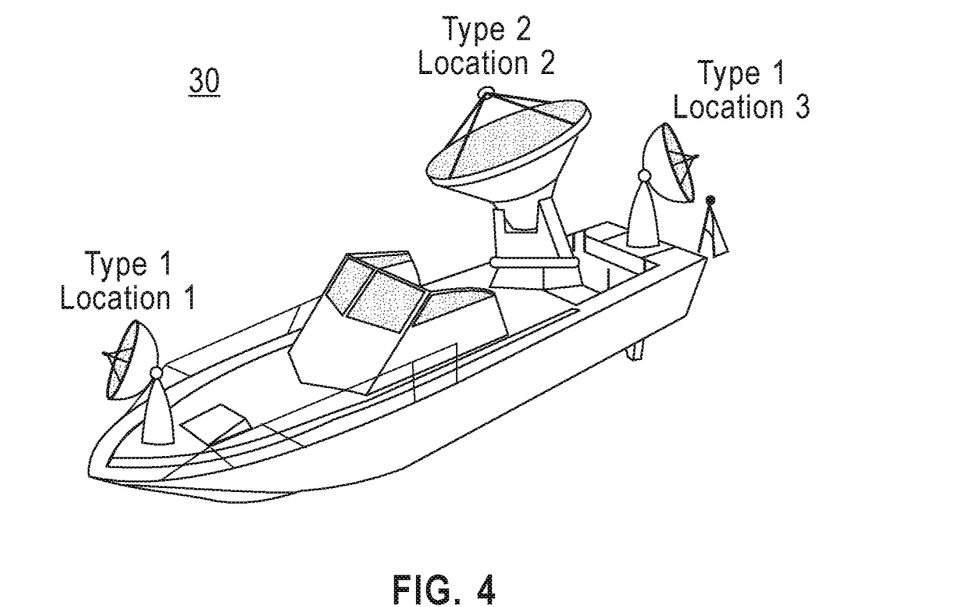
FIG. 4 shows a specific platform with possible emitters present.

Consider again the example of FIG. 4. Each of the three locations may contain an emitter. The probability of existence is simply how likely an emitter is to be present at each of the locations. Next, consider the example in FIGS. 5 and 6. The probability that an emitter will be present in location 1 is equal to the probability that an emitter of type 1 is present in either physical location or simply the probability that this platform will contain an emitter of type 1. This probability term is $P(E_q)$.

The probability of transmission is a probability that the emitter is transmitting when the platform is encountered. This term assumes that the receiver has encountered this platform with a configuration that has this emitter present. This term may be stated as the probability that the emitter is transmitting given that the emitter is present. This term is $P(T_q|E_q)$.

The probability of reception assumes that the platform was encountered, the emitter is present at the proper location, and the emitter is transmitting. This term is the probability that the receiver detects the emitter when all these conditions are met. This does not mean that the emitter was identified properly. This term describes the event that some energy was radiated from an emitter and from this energy the receiver was able to determine that an emitter was present. This term can be stated as the probability that an emitter is detected given that the emitter is present and transmitting. This term is $P(D_g|T_q \cap E_q)$. Since the emitter cannot be transmitting unless it is also present this may be simplified to $P(D_g|T_g)$ both conceptually and mathematically.

It was described earlier that all three conditions must be met to consider the event a success. It is intuitive that the emitter must be present and transmitting for the emitter to be detected. The final term is $P(D_q \cap T_q \cap E_q)$, and this term is equal to $P(D_q)$.

The final step is combining the terms to achieve $P(D_q)$. The formula is given in equation 6.

$$P(D_A) = P(D_q|T_q)P(T_q|E_q)P(E_q) \quad \text{Equation (6)}$$

In one embodiment, the method determines the probability that the receiver detects energy from a particular emitter assuming that a platform of a particular type has been encountered. There may be times where this probability term is unavailable due to one or more of the previous terms being unknown. Each of the terms of Equation 6, while very valuable, are all not strictly necessary to compute a reasonable probability term. In one embodiment, there are general rules to choose nominal values for these terms. The simplest way to handle the case where these terms cannot be computed is to set the probability terms to a common, nominal value. It should be intuitive that setting this term to a value close to 0 will make it very likely that each platform will contain a small number of observed emitters. It will be very unlikely that any platform could have more than one emitter observed. The effect of this will be that when few emitters are detected the algorithm will not heavily favor platforms with only a single emitter location. For example consider a platform containing just one emitter type and a second platform containing ten emitter types. If a single emitter is observed of the type that is common to both platforms, both platforms will have a similar probability computed. Alternatively, if the nominal term is set very close to 1 a similar effect will occur. When the number is high it will be likely that each platform will contain the maximum number of possible emitters. Consider again the example, if a single common emitter is observed the algorithm will compute a much higher probability that the platform with only one emitter location was the platform encountered. This is, intuitively, because it is very unlikely that the second platform would have only a single emitter detected. Tuning this value will allow the user to determine whether the algorithm values inclusive similarities or exclusive similarities to the emitters observed.

The next step is to determine the probability that a particular combination of emitters could be detected in an environment populated by the platforms described in the environment description. Previously, we described a method to find all the emitter combinations that could be encountered in this environment. It should be clear that there may be cases where multiple platforms could be encountered with identical emitter combinations. The method of determining the total probability of encountering a particular combination is to find the conditional probability of encountering the combination on each specific platform and using total probability to remove the condition of platform type from the result.

In one embodiment, determining the total probability of each combination includes determining the conditional probability of each combination for a given platform, P(c|b). The simplest way to do this is to start by determining all the possible permutations of emitters on the platform. A permutation is an ordered set of items. In this case, the order is given by the emitter location index. The order is important because each emitter location may have a unique probability of existence, even when the emitter types are common.

This is done similar to the method used to initially determine the complete set of emitter combinations. The major difference is that the set must not be reduced for duplicate entries. Each entry describes a unique event, which has a unique probability of occurrence. There are $2^{Q_b}$ unique configurations that could be encountered on this platform. Some of these configurations may have a probability of 0, but all events must be considered. To find the complete set of events, we again generate a binary number from 0 to $2^{(Q_b)}-1$ where each place of the binary number describes an emitter location on the given platform designated by qb.

Each of the $2^{Q_b}$ events have a calculable probability. Each event is defined by a list of which emitter locations are active and which are not active. The probability that each emitter is active is defined in the environment description list. The presence of each emitter is mutually independent of the presence of all other emitters on the platform, by definition, so the probability of each event is the product of the probability that each emitter is in the state defined by the binary sequence. Calculating the probability of each event requires the following steps.

1) Extract the list of probabilities that each emitter location contains an active emitter.
2) Extract the vector of binary values for the event of interest.
3) Each time a 0 is encountered in the vector of binary values, replace the value, X, with (1−X) in the vector of probabilities.
4) Find the product of the resulting vector.

At this point, there is a probability term associated with each of the combinations. It is not efficient to find all of these probabilities initially, but it eases the explanation of the method, the opportunity to reduce computation should become obvious. Each event is defined as a specific ordered set of emitter locations being active and inactive. The purpose of this step is to determine the probability that a specific emitter combination was encountered on a specific platform. The following steps operate on the probability vector resulting from the previous steps.

1) Identify the unordered combination corresponding to each event by sorting the emitter types in ascending order.
2) Determine which, if any, of the events are identical to the specified combination.
3) Sum the probability of the identical events.

The final sum is the probability that a combination in encountered for a specific platform, P(c|b).

At this point, the probability of any combination can be found for the event where a particular platform in encountered. This term, P(c|b), along with the unconstrained probability that a platform is encountered, P(b), can be used to determine the unconstrained probability that a combination is encountered, P(c). The final computation for P(c) is a simple summation shown in equation 7, where the sum is taken over all platforms defined in the environment description. This operation is duplicated for each combination listed in the complete set of emitter combinations.

$$P(c) = \sum_{b=1}^{B} P(c|b)P(b) \quad \text{Equation (7)}$$

Probability of a Platform Given a Combination

The final step of preprocessing is to generate a matrix of P(b|c) for all C and all B. The necessary values are available from the previous steps and the final operation is a simple function of the available terms known as Bayes Theorem. The solution, using terms derived above is shown in equation 8.

$$P(b \mid c) = \frac{P(c \mid b)P(b)}{P(c)} \quad \text{Equation (8)}$$

This value must be computed for all c and all b. The resulting matrix contains C*B entries. In the associated code, P(c|b) is calculated each time it is needed. Efficiency could be enhanced by computing and storing the term P(c|b)P(b) in a matrix prior to solving the terms P(c) and P(b|c) which would trade processing time for additional storage.

Computation (Runtime)

In the runtime stage, emitter probability given an observation is determined. An observation is defined as a set of conclusions drawn about the emitters detected when a single platform is encountered. The conclusions take the shape of a set of probabilities describing the likelihood that each encountered emitter was of a particular type. The observations are most easily described by a matrix with a row for each observed emitter with a column indicating each of the types of emitters described in the environment description.

The first piece of information that can be taken from the data in this matrix is the number of emitters observed. An observation requires that an emitter be present, active, and received before the receiver can report its presence. Each row on the matrix states that an emitter on the platform encountered met all three of those conditions. It should be clear that there are times where one or more of those conditions will fail and there will not be detection. If an emitter is not detected then the only conclusion that can be drawn is that it was not detected and no other inference can be made about its other qualities. It is assumed that each and every row of the matrix contains information about a detected emitter. There is no probability defined for the possibility that an emitter is detected when it was not present or transmitting. It is assumed that there is a 0 probability that any type of false detect could occur. This also implies that every row contains information about a unique emitter. There is a 0 probability that information from an emitter could be detected as more than one emitter.

Each row of the observation matrix contains information about the type of emitter that was detected in this instance. Each column of this matrix indicates a type of emitter. The order of the columns or method of numbering the emitter types in unimportant, but must be consistent with the environment description. Each element of the row should contain the probability that the detected emitter is of the type signified by the column index. This matrix contains all the necessary information to begin processing the solution.

In order to address the possibilities that the data from the observation may not be formatted correctly or that the conclusions drawn from the observation will not be strictly probability terms, in on embodiment, a method may be applied to achieve an estimate of probability in each vector. This disclosure contains one example of method to use based on a simple assumption, however, any method of estimating probability terms in this data set could be valid as long as the requirements of the format are met.

In one embodiment, the probability matrix need not strictly be a probability term but may be a linear function of probability. Each entry of each row must be multiplied by a common gain term, but that term may vary over rows. This is possible because of the implicit normalization done when impossible combinations are discarded. A side effect of this is that it isn't necessary that the number of emitter types defined in this table be identical to the number of unique emitter types in the environment description. It is necessary that this table contains at least all the emitter types in the environment, but may contain others, and they may have a nonzero probability associated with them. The impossible emitters will form impossible combinations and will be naturally discarded.

Each row contains information about a single emitter. Each element contains the probability that this emitter is of a particular type. Each column describes a unique event, the event that this emitter is of a specific type. This emitter, as stated above, must exist and is further constrained that it must be of one of the types described by the environment description. Because of this, the events described by this matrix are the spanning set of outcomes of this random event. Thus, the sum of the probabilities of each row must sum to 1. One simple way to accomplish this is to divide each element of the row by the sum of the entries of the row. This will format the data properly to continue the runtime processing procedure.

Combination Probability Given Emitter Probability

This segment describes one embodiment of the method to determine the probability that a specific combination of emitters was encountered based on the observation matrix. At this point it is necessary to identify some assumptions that must be made about the observation matrix for the algorithm to be valid.

First, it is necessary to assume that the data in the observation matrix is, in fact, the probability that each emitter is of a particular type. As was identified in the previous section, this may not be a probability but is more likely an approximation of the probability. Additionally, this data likely doesn't account for the unconstrained probability of each event when calculating the probability of the event dependent on the observation. Most likely, this data was calculated based on the assumption that each emitter is equally likely prior to making an observation and the conditional probability is based on that assumption. This data was computed using a method not visible to this algorithm, so it would be impossible to apply a correction based on our knowledge of the environment and corresponding knowledge of the frequency of encountering each emitter type.

Second, it is necessary to treat each row of the data matrix as a mutually independent event for the following math to be valid. This step computes the probability of encountering a combination of emitters. To compute this term precisely it is important to know how the probability of each emitter is conditioned on the presence of every other emitter. This data relating each observation to the other observations is not available and we only have access to each term individually. If the events were independent, then the data provided would be sufficient to compute the probability of a combination precisely.

In one example, if there are M emitters present in this encounter, each of the emitters must be of one of the types described by the column index. The assumptions made above state that there is no relationship between the emitters and there are no constraints on the events other than the probabilities listed in the matrix. With no additional constraints on the encounter, there are $N^{AM}$ unique permutations that may have been encountered from the data in this observation and the probability may be calculated with no additional information.

It is important to understand that the NAM events that can be described by this matrix are permutations of emitters and not combinations. This is because each row contains a unique instance of an emitter. Row 1 contains information about a different emitter than row 2 even if the types are identical. The order of the rows is not important, but it must be understood that these rows describe unique emitters. Consider an example where there are two emitters detected and the environment contains two types, A and B. Emitter 1 could be of type A and emitter 2 could be of type B. This event has some probability of occurring. It could also happen that emitter 1 was a type B and emitter 2 was of type A. This is a unique event even though the combination of emitters encountered was the same.

Determining the probability of each of these events is a trivial product because of the simplifying assumptions. Each row is an independent event and each outcome has some probability. For any set of outcomes, the event where all the outcomes occur simultaneously is simply the product of the probabilities. Consider the example where there are four emitter types defined and there are three emitters detected. The observation table 40 will be formatted as in FIG. 7.

Recall that each row is information about an unknown, but unique, emitter that was encountered. The probability that the first emitter listed is of type 4, the second is of type 1, and the third is of type 4 is the product in equation 9.

$$P(E_1=4 \cap E_2=1 \cap E_3=4)=(0.27)(0.55)(0.5) \qquad \text{Equation (9)}$$

The resulting probability that this emitter permutation was encountered is equal to 0.07. If all the permutations of these 3 emitters over the four types were solved and summed the resulting sum would naturally be 1. This is only true when the numbers are probabilities and each row sums to 1.

This data needs to be related to the environment description so that the emitters detected can be correlated with the platforms that exist in the environment. The rows do not describe any particular emitter location on a platform, just an implication that each row is a unique emitter location on a platform. There is no information about how the order of the rows corresponds to the numbered emitter locations. This is the reason why emitter combinations are considered. Combinations can be used consistently between the observation and the environment without a loss of data.

To determine the probability that a specific combination were encountered, all of the permutations that satisfy that combination would need to be considered. As identified earlier, all the permutations that sort to a common vector would be identical combinations. In the example shown in FIG. 7, there are three different ways to achieve the combination represented by that specific permutation. The number of permutations is exactly three in this case, but that number is not general for a detection of three emitters. The number of permutations is a function of the number of emitters as well as the number of duplicates. It may be intuitive that there is exactly one permutation that achieves the combination containing three identical types. When there are no duplicates, the number of permutations increases.

A simple, but computationally intensive, way to determine the probability of encountering a combination would be to solve the probability of the NAM permutations and sorting to identify which permutations correspond to each combination. Then the corresponding probabilities could be solved by summing the probabilities of the matching permutations. Another way would be to start with the combination and then find all the permutations that satisfy the combination.

In one embodiment, a method that demonstrates a procedural way to determine all the possible permutations for a specific combination is disclosed. The following method is one way to generate a list of permutations in lexicographical order.

In one embodiment, the method is done on combinations that have been defined in the preprocessing stage. The method starts by selecting a combination that has the same number of emitters as the current observation. This combination should already have the emitter type indices listed in weakly ascending order. This combination, viewed as an ordered set, will serve as the first permutation. Next, a series of steps are repeated until the terminal permutation is found. The current permutation is a vector of indices called Ag and the following steps determine the vector Ag+1 until AG is reached.
1) Find the largest index k such that $A_g[k] < A_g[k+1]$. If no such index exists, the permutation is the last permutation.
2) Find the largest index l greater than k such that $A_g[k] < A_g[l]$.
3) Swap the value of $A_g[k]$ with that of $A_g[l]$.
4) Reverse the sequence from $A_g[k+1]$ up to an including the final element.

The vector resulting from this operation yields $A_g+1$ and if the test in step 1 does not pass then the vector $A_g$ was equal to the terminal permutation $A_G$.

To demonstrate this method, consider the selected permutation from the previous example. The sequence [4 1 4] sorted in weakly ascending order yields [1 4 4] which is the way a combination is represented in the previous section. The lexicographical sequence of permutations corresponding to combination [1 4 4] is tabulated below.

| Ag | k | l |
|---|---|---|
| [1 4 4] | 1 | 3 |
| [4 1 4] | 2 | 3 |
| [4 4 1] | Done | Done |

Once all the permutations that satisfy the combination have been discovered, the probability that each permutation was encountered may be computed using the product defined above. The probability of the combination is simply the sum of the probabilities of all the satisfying permutations.

The above example is one embodiment of the steps to determine the probability that any single combination has occurred based on the probabilities computed during the observation. It is known with perfect certainty that exactly M emitters were encountered and the M rows in the observation table are based on those M emitters respectively. So it is known that only combinations with exactly M emitters have a probability other than 0. To restate using the example in FIG. 7, the probability that any emitter combination containing a number of emitters more or less than 3 is exactly 0.

There are NAM permutations and a set of unique combinations numbering less than or equal to NAM. The assumptions made will cause the probabilities of the NAM permutations to sum naturally to 1. Since the probability of each combination is the sum of a unique set of permutations it will naturally add to 1 as well.

In one possible scenario, it may be unable to find the precise probability of the combinations based on the environment, but it is known which combinations are impossible. In this case, it is possible to restate the probability of a combination based on the condition that the combination must be possible. If the observation matrix were accurate then the impossible combinations would have a probability equal to 0, but all these values were computed based on an unknown environment. A very weak, but safe, application of the environment to the data is to find the probability of each combination given the combination observed must have been possible. This constraint simply removes portions of the Venn diagram and reduces the area of the total possible events as shown in FIG. 8.

Figure 8:
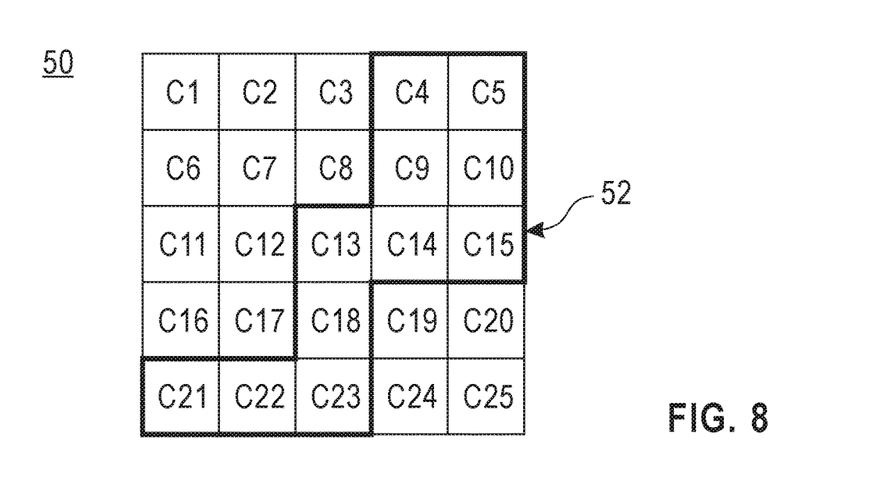
FIG. 8 is an example of a Venn diagram.

The Venn diagram 50 in FIG. 8 shows the set of combinations that are possible for some observation matrix. The sum of the probabilities must sum to 1. If the constraint is applied that only the combinations shown within section 52 within the bold lines could occur then the conditional probability may be solved for the possible terms. The Venn diagram allows probability to be visualized as an area, and the area of a space must sum to 1. The area of the complete space is defined as 1 and the information in the diagram is the relative area between events or sums of events of interest. Reducing the area of the event space does not change the ratio of the events within the remaining space. As discussed earlier, the complete set of events has a natural probability of 1. If the set of events is reduced, the probabilities of the remaining events must simply be normalized to sum to 1. These normalized values are the conditional probability of the event.

In one embodiment, the impossible combinations are removed and the probability of the remaining possible combinations are normalized. Because of this, there is no reason to solve the observed probability of combinations that aren't possible.

A list of possible combinations is available from the preprocessing stage. Start by building a vector of probabilities corresponding to each of the possible combinations. The combinations that contain a number of emitters not identical to the number of rows of the observation matrix should be assigned a probability of 0. The following sequence must be done for each of the combinations containing M emitters to achieve a final vector of probabilities.
1) Select an unordered combination from the set of possible combinations.
2) Find all possible permutations
3) Calculate the probability of each permutation
4) Sum the probability of the set of permutations and insert into the probability vector.

Once this is complete for all M length combinations, normalize the vector of probabilities so that it sums to 1. This final vector is the probability that a combination of emitters was encountered given the observed data and constrained by the existence of combinations in this environment. This term is P(c|x).

Probability of Platform

This step determines the probability that a specific platform was encountered in the defined environment given the conclusions drawn from the observation. This solution is based on reducing the number of conditions of an event using total probability. The identity shown in equation 10 demonstrates that one of the conditions is independent of the event of interest and simplifies the equation to use the data available from the previous steps. This equation may be ignored by the casual reader.

$$P(B_b|C_c \cap x) \qquad \text{Equation (10)}$$

In this equation, x is the observation and the resulting data. It is intuitive that the probability of encountering a platform is based on which emitters are actually present. The observation does not add any information about the event when the emitters are known.

In one embodiment, the probability that each of the defined platforms is the platform encountered is solved. Since the environment is defined completely and the assumptions are consistent, the sum of the probabilities of encountering each platform type should be 1. If the result is not naturally 1, an error was made. The entire space of this event is the platforms defined in the environment description.

The previous step yielded the term P(c|x) and the final step of the preprocessing stage yielded the term P(b|c). The final stage obtains information from 2 vectors.

$$P(C=c|x) \triangleq P(c|x) \qquad \text{Equation (11)}$$

$$P(B=b|C=c) \triangleq P(b|c) \qquad \text{Equation (12)}$$

The meaning of equation 11 is the probability that the combination, C, is equal to a specific combination index, c, which may be defined as an integer index to the previously computed vector. This vector was solved in the previous step. Likewise, the condition in equation 12 for combination is identical. The meaning of equation 12 is the probability that platform B is of the type b, which again may be an integer index into the vector of platform types. The matrix for the term in equation 12 was solved in equation 8.

The final solution for a single platform is given in equation 13. This should be solved for all B and the resulting vector is the output of this function.

$$P(B=b\mid x) = \sum_{c=1}^{C} P(B=b\mid C=c)P(C=c\mid x) \qquad \text{Equation (13)}$$

In one example, a mission data file (MDF) contains a list of platforms with the list of emitters present on the platform. In one embodiment, the method assumes that this contains all the platforms and emitters that may exist in the environment. The environment is the set of platforms that may be encountered containing emitters that may be detected with a non-zero probability. The method determines the probability of encountering each type of platform (equal likelihood for all platform types as default) and the probability that each emitter is present/emitting/detected (equal likelihood for all emitters on all platforms as default). The MDF also contains a complete list of all platforms that may exist in the environment. Each platform entry contains a complete list of the emitters that may be present on each platform type. The probability that each emitter is present/emitting/detected is mutually independent of all other emitter types.

In one embodiment, an ambiguity table contains information about a set of emitters detected and assigned to a single platform and provides the confidence that each detected emitter is of each type specified by the MDF. Confidence data is a functional approximation of probability computed through parameter matching. A transformation function can achieve an adequate approximation of a probability vector from a confidence vector. Initial transformation method is to linearly scale the confidence terms to achieve a sum of 1 for each detected emitter.

The ambiguity table contains information about a set of emitters detected that exist on a common platform. The table contains a row for each detected emitter. Each column of the table represents an emitter type. The entry for each emitter/type pair is the confidence that the emitter is of the particular type. The number of rows in the table is exactly the number of emitters detected. Each row describes an event that is mutually independent of the events described on the other rows.

A P(Combination|Observation) table contains the probability that each N emitter combination exists given the set of observations. It is known that the true combination must be of the set of possible combinations defined by the MDF. A vector that contains the probability that each possible emitter combination exists given the information present in the N emitter ambiguity table. The vector is derived from the ambiguity table after transformation from confidence to probability. The probability of each of the N emitter combinations may be solved by assuming independence between emitters. The rows of the ambiguity table are not independent. Combinations defined as impossible by the MDF may naturally have a nonzero probability. Impossible combinations are forced to 0 probability to approximate the dependence between emitters.

Figure 9:
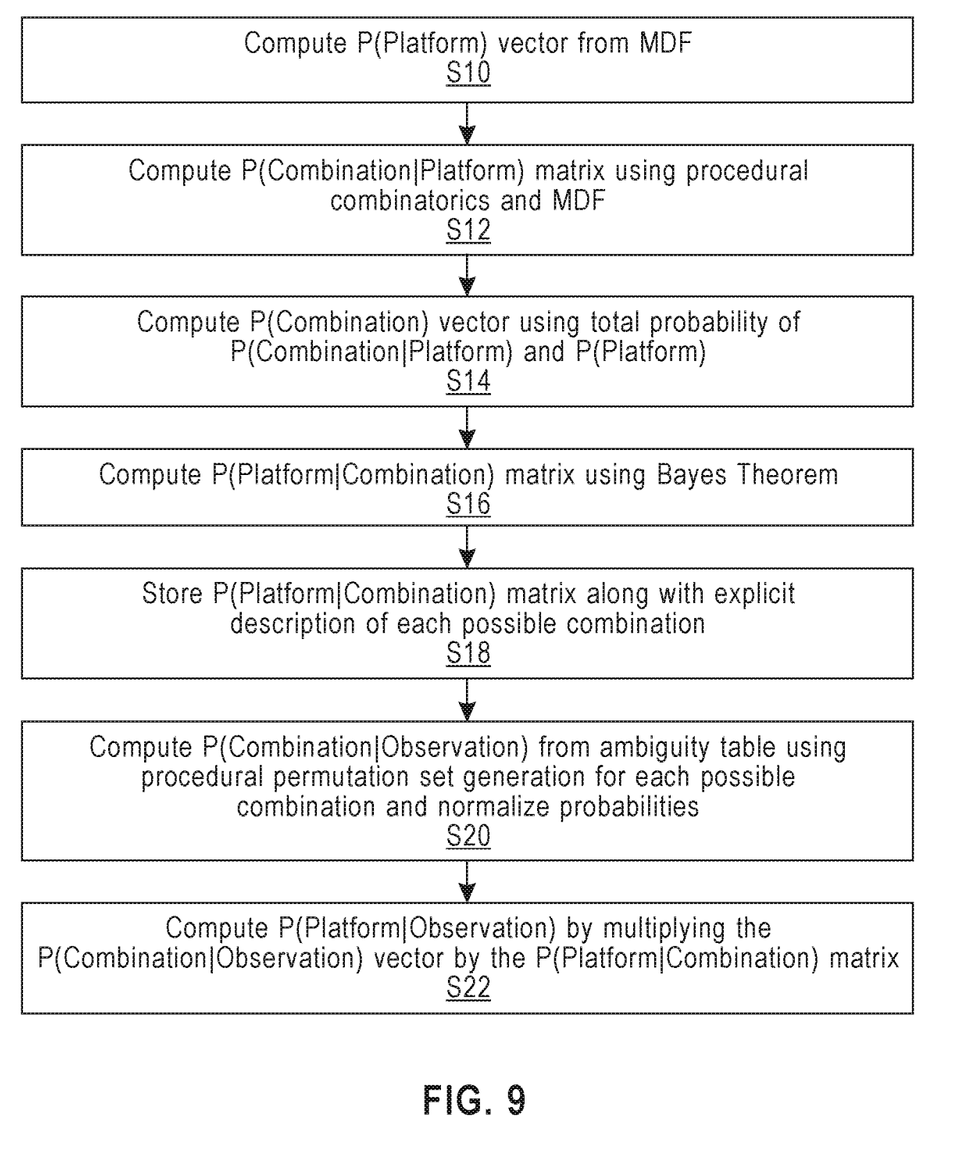
FIG. 9 is a flow diagram of one embodiment of the method disclosed in this specification.

In one embodiment, as shown in FIG. 9, the following preprocessing steps must be performed once potentially prior to mission. Step S10 compute P(Platform) vector from MDF, step S12 compute P(Combination|Platform) matrix using procedural combinatorics and MDF, step S14 compute P(Combination) vector using total probability of P(Combination|Platform) and P(Platform), step S16 compute P(Platform|Combination) matrix using Bayes Theorem, and step S18 store P(Platform|Combination) matrix along with explicit description of each possible combination. The size of the matrix is the number of unique combinations possible in the MDF by the number of Platforms identified in the MDF. The following runtime processing include step S20 compute P(Combination|Observation) from ambiguity table using procedural permutation set generation for each possible combination and normalize probabilities and step S22 compute P(Platform|Observation) by multiplying the P(Combination|Observation) vector by the P(Platform|Combination) matrix.

Figure 10:
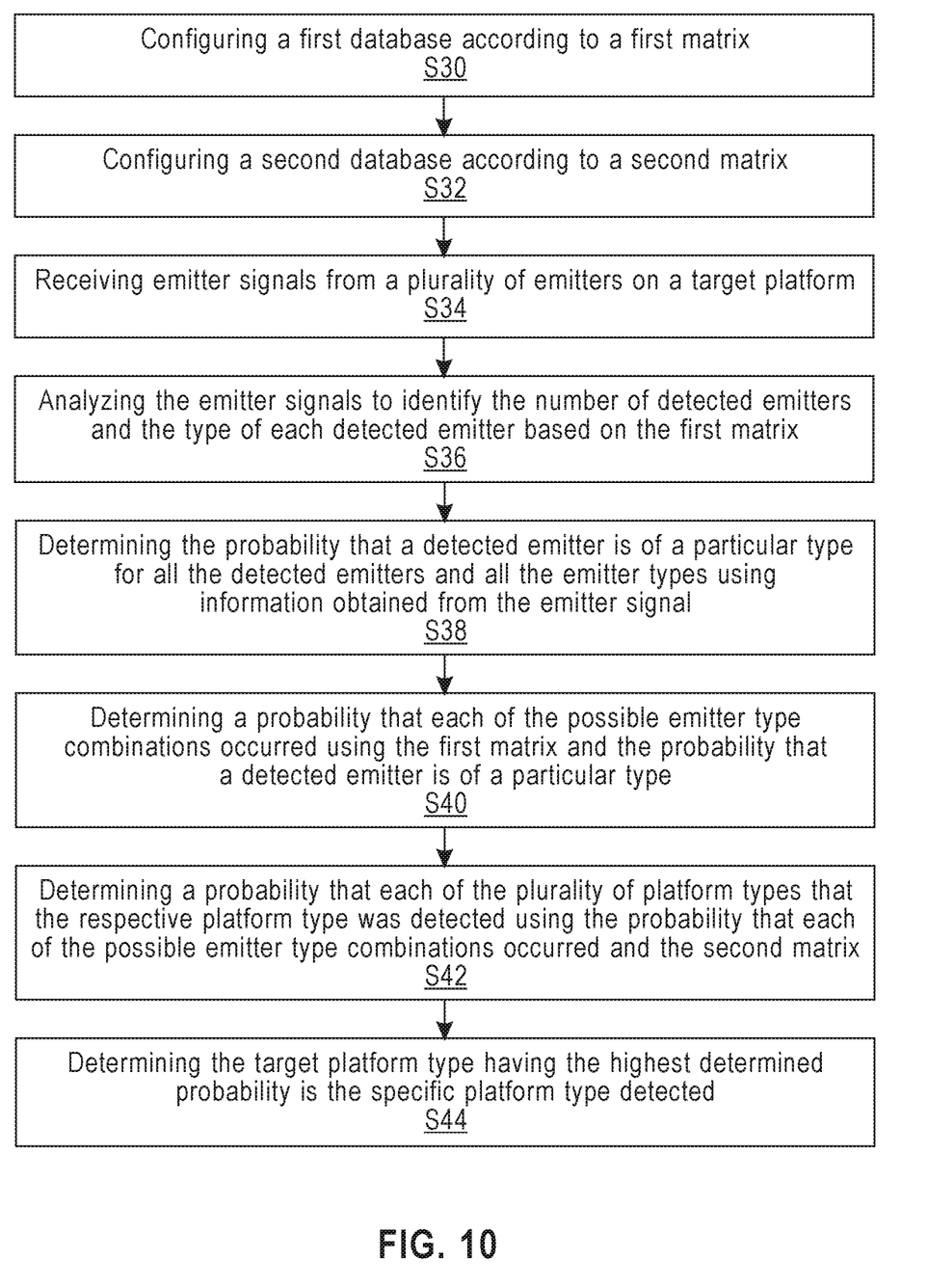
FIG. 10 is a flow diagram of one embodiment of the method disclosed in this specification.

In one embodiment, a computer implemented method is shown in FIG. 10 for determining that a specific target platform type of a plurality of possible platform types was detected by a receiver on a tracking platform. The plurality of possible platform types have at least one emitter of a plurality of emitter types. The method includes step S30 configuring a first database according to a first matrix. The first matrix has a respective probability for each of a plurality of possible emitter type combinations being on a single platform of the plurality of possible platform types. The method includes step S32 configuring a second database according to a second matrix. The second matrix has a probability that each of the plurality of possible platform types is the detected type given each of the plurality of possible combinations in the first matrix.

The method further includes step S34 receiving emitter signals from a plurality of emitters on a target platform. The emitter signals are detected by the receiver on the tracking platform in response to a tracking signal. Step S36 is analyzing the emitter signals to identify the number of detected emitters and the type of each detected emitter based on the first matrix. The method further includes step S38 determining the probability that a detected emitter is of a particular type for all the detected emitters and all the emitter types using information obtained from the emitter signals, step S40 determining a probability that each of the possible emitter type combinations occurred using the first matrix and the probability that a detected emitter is of a particular type, step S42 determining a probability for each of the plurality of platform types that the respective platform type was detected using the probability that each of the possible emitter type combinations occurred and the second matrix and step S44 determining the target platform type having the highest determined probability is the specific platform type detected.

Figure 11:
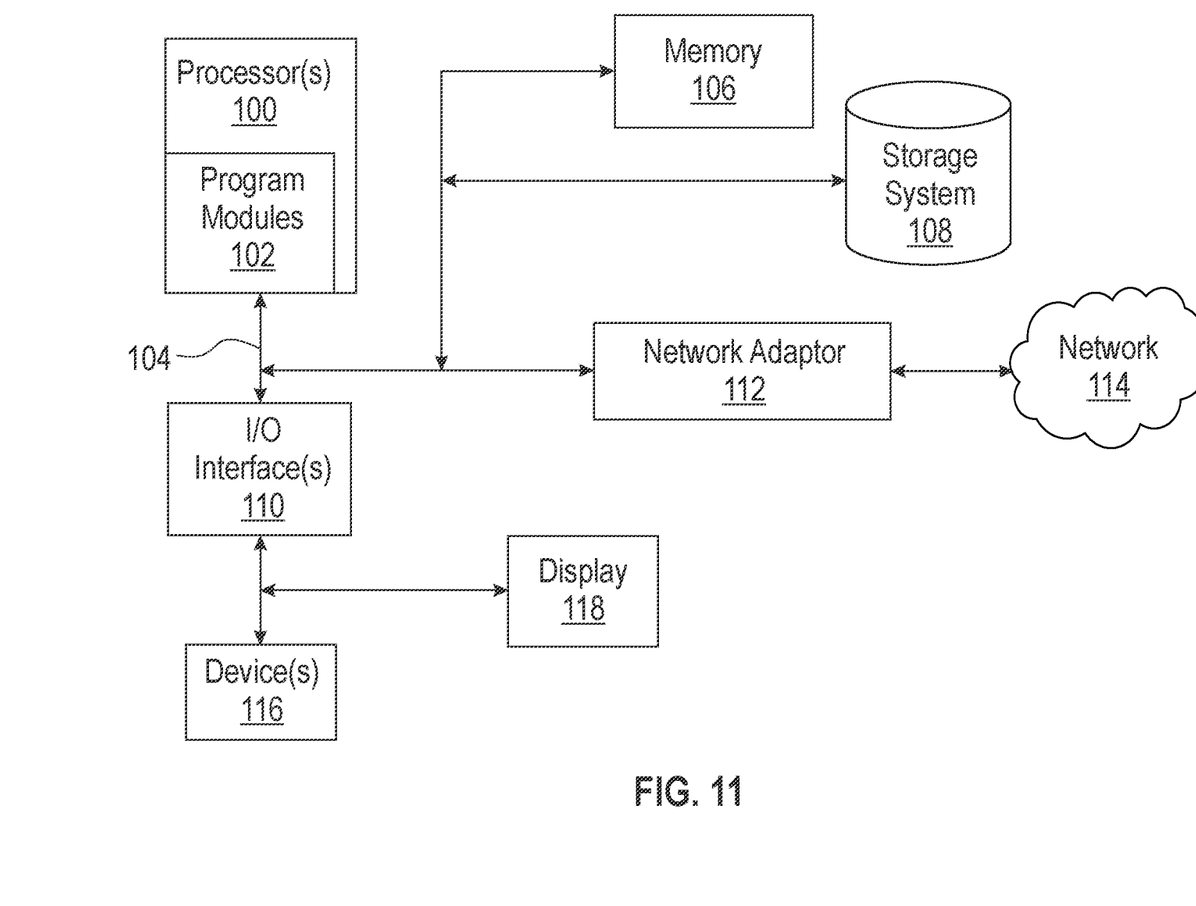
FIG. 11 is a block diagram of an exemplary computing system suitable for implementation of the embodiments of the invention disclosed in this specification.

FIG. 11 illustrates a schematic of an example computer or processing system that may implement the methods disclosed in one embodiments of the present disclosure. The computer system is only one example of a suitable processing system that may be used to implement the embodiments and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

The computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, the computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the network address configuration methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other components and functionality not reflected in the illustrations will be apparent in light of this disclosure, and it will be appreciated that other embodiments are not limited to any particular hardware or software configuration. Thus in other embodiments system may comprise additional, fewer, or alternative subcomponents as compared to those included in the example embodiments.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments disclosed herein. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure not be limited by this detailed description, but rather by the claims appended hereto. Future filed applications claiming priority to this application may claim the disclosed subject matter in a different manner, and may generally include any set of one or more elements as variously disclosed or otherwise demonstrated herein.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A computer implemented method to determine that a specific target platform type of a plurality of possible platform types was detected by a receiver on a tracking platform, the plurality of possible platform types having at least one emitter of a plurality of emitter types, the method comprising:
    configuring a first database according to a first matrix, the first matrix comprising a respective probability for each of a plurality of possible emitter type combinations being on a single platform of the plurality of possible platform types;
    configuring a second database according to a second matrix, the second matrix comprising a probability that each of the plurality of possible platform types is the detected type given each of the plurality of possible combinations in the first matrix;
    receiving emitter signals from a plurality of emitters on a target platform, the emitter signals being detected by the receiver on the tracking platform in response to a tracking signal;
    analyzing the emitter signals to identify the number of detected emitters and the type of each detected emitter based on the first matrix;
    determining the probability that a detected emitter is of a particular type for all the detected emitters and all the emitter types using information obtained from the emitter signals;
    determining a probability that each of the possible emitter type combinations occurred using the first matrix and the probability that a detected emitter is of a particular type;
    determining a probability for each of the plurality of platform types that the respective platform type was detected using the probability that each of the possible emitter type combinations occurred and the second matrix; and determining the target platform type having the highest determined probability is the specific platform type detected.

2. The method according to claim 1, further comprising configuring the first database according an array of matrices and a one dimensional vector.

3. The method according to claim 2, wherein the array of matrices describes the emitter types and the probability that each is present and the vector contains the unconditional probability that each of the corresponding platform types would be detected during a random encounter with the tracking platform.

4. The method according to claim 3, wherein each element of the array matrices contains a description of the emitter types that may exist on a platform and the probability that they are present, active, and detected by the receiver.

5. The method according to claim 4, wherein the first row of each matrix contains a list of emitter types, each emitter type being assigned a unique index that defines the type of emitter that may exist on any platform at any location, the column of each matrix describes a specific possible emitter location on the platform being described, and the second row of each matrix contains the probability that an emitter is present at the specific emitter location, is transmitting, and is detected by the receiver for an encounter with the platform type.

6. The method according to claim 1, wherein the probabilities for each of the plurality possible emitter type combinations in the first matrix are based on a target platform environment description.

7. A computer system for determining that a specific target platform type of a plurality of possible platform types was detected by a receiver on a tracking platform, the plurality of possible platform types having at least one emitter of a plurality of emitter types, the system comprising:
- one or more computer processors;
- one or more non-transitory computer-readable storage media;
- program instructions, stored on the one or more non-transitory computer-readable storage media, which when implemented by the one or more processors, cause the computer system to perform the steps of:
- configuring a first database according to a first matrix, the first matrix comprising a respective probability for each of a plurality of possible emitter type combinations being on a single platform of the plurality of possible platform types;
- configuring a second database according to a second matrix, the second matrix comprising a probability that each of the plurality of possible platform types is the detected type given each of the plurality of possible combinations in the first matrix;
- receiving emitter signals from a plurality of emitters on a target platform, the emitter signals being detected by the receiver on the tracking platform in response to a tracking signal;
- analyzing the emitter signals to identify the number of detected emitters and the type of each detected emitter based on the first matrix;
- determining the probability that a detected emitter is of a particular type for all the detected emitters and all the emitter types using information obtained from the emitter signals;
- determining a probability that each of the possible emitter type combinations occurred using the first matrix and the probability that a detected emitter is of a particular type;
- determining a probability for each of the plurality of platform types that the respective platform type was detected using the probability that each of the possible emitter type combinations occurred and the second matrix; and
- determining the target platform type having the highest determined probability is the specific platform type detected.

8. The system according to claim 7, further comprising configuring the first database according an array of matrices and a one dimensional vector.

9. The system according to claim 8, wherein the array of matrices describes the emitter types and the probability that each is present and the vector contains the unconditional probability that each of the corresponding platform types would be detected during a random encounter with the tracking platform.

10. The system according to claim 9, wherein each element of the array matrices contains a description of the emitter types that may exist on a platform and the probability that they are present, active, and detected by the receiver.

11. The system according to claim 10, wherein the first row of each matrix contains a list of emitter types, each emitter type being assigned a unique index that defines the type of emitter that may exist on any platform at any location, the column of each matrix describes a specific possible emitter location on the platform being described, and the second row of each matrix contains the probability that an emitter is present at the specific emitter location, is transmitting, and is detected by the receiver for an encounter with the platform type.

12. The system according to claim 7, wherein the probabilities for each of the plurality possible emitter type combinations in the first matrix are based on a target platform environment description.

13. A computer program product comprising:
- a non-transitory computer-readable medium having program instructions stored thereon, where execution of the program instructions using a computer causes the computer to perform a method for determining that a specific target platform type of a plurality of possible platform types was detected by a receiver on a tracking platform, the plurality of possible platform types having at least one emitter of a plurality of emitter types, comprising:
- configuring a first database according to a first matrix, the first matrix comprising a respective probability for each of a plurality of possible emitter type combinations being on a single platform of the plurality of possible platform types;
- configuring a second database according to a second matrix, the second matrix comprising a probability that each of the plurality of possible platform types is the detected type given each of the plurality of possible combinations in the first matrix;
- receiving emitter signals from a plurality of emitters on a target platform, the emitter signals being detected by the receiver on the tracking platform in response to a tracking signal;
- analyzing the emitter signals to identify the number of detected emitters and the type of each detected emitter based on the first matrix;
- determining the probability that a detected emitter is of a particular type for all the detected emitters and all the emitter types using information obtained from the emitter signals;

determining a probability that each of the possible emitter type combinations occurred using the first matrix and the probability that a detected emitter is of a particular type;

determining a probability for each of the plurality of platform types that the respective platform type was detected using the probability that each of the possible emitter type combinations occurred and the second matrix; and determining the target platform type having the highest determined probability is the specific platform type detected.

14. The computer program product according to claim 13, further comprising configuring the first database according an array of matrices and a 1 dimensional vector.

15. The computer program product according to claim 14, wherein the array of matrices describes the emitter types and the probability that each is present and the vector contains the unconditional probability that each of the corresponding platform types would be detected during a random encounter with the tracking platform.

16. The computer program product according to claim 15, wherein each element of the array matrices contains a description of the emitter types that may exist on a platform and the probability that they are present, active, and detected by the receiver.

17. The computer program product according to claim 16, wherein the first row of each matrix contains a list of emitter types, each emitter type being assigned a unique index that defines the type of emitter that may exist on any platform at any location, the column of each matrix describes a specific possible emitter location on the platform being described, and the second row of each matrix contains the probability that an emitter is present at the specific emitter location, is transmitting, and is detected by the receiver for an encounter with the platform type.

18. The computer program product according to claim 13, wherein the probabilities for each of the plurality possible emitter type combinations in the first matrix are based on a target platform environment description.

* * * * *